US008643510B2

(12) United States Patent
Schräbler et al.

(10) Patent No.: US 8,643,510 B2
(45) Date of Patent: Feb. 4, 2014

(54) VEHICLE KEY

(75) Inventors: Sighard Schräbler, Karben (DE); Ralf Fleischmann, Wöllstadt (DE); Marc Menzel, Marburg (DE); Sebastian Strunck, Rüsselsheim (DE); Stephan Pahlke, Hannover (DE)

(73) Assignee: Continental Teves AG & Co. oHG (DE)

( * ) Notice: Subject to any disclaimer, the term of this patent is extended or adjusted under 35 U.S.C. 154(b) by 566 days.

(21) Appl. No.: 12/865,002

(22) PCT Filed: Jan. 30, 2009

(86) PCT No.: PCT/EP2009/051065
§ 371 (c)(1),
(2), (4) Date: Feb. 28, 2011

(87) PCT Pub. No.: WO2009/095472
PCT Pub. Date: Aug. 6, 2009

(65) Prior Publication Data
US 2011/0140926 A1    Jun. 16, 2011

(30) Foreign Application Priority Data
Jan. 31, 2008  (DE) .......................... 10 2008 007 141
Jan. 30, 2009  (DE) .......................... 10 2009 006 975

(51) Int. Cl.
G08G 1/123        (2006.01)
(52) U.S. Cl.
USPC ........................................... 340/989; 340/990
(58) Field of Classification Search
USPC ........... 340/989, 990, 993; 701/469, 468, 491
See application file for complete search history.

(56) References Cited

U.S. PATENT DOCUMENTS

| 5,723,911 | A | 3/1998 | Glehr | |
|---|---|---|---|---|
| 6,198,915 | B1 | 3/2001 | McGregor et al. | |
| 6,738,712 | B1* | 5/2004 | Hildebrant | 701/431 |
| 6,774,764 | B2 | 8/2004 | Ghosh et al. | |
| 8,232,897 | B2* | 7/2012 | Tieman et al. | 340/990 |
| 2001/0038328 | A1 | 11/2001 | King et al. | |
| 2002/0008615 | A1 | 1/2002 | Heide et al. | |
| 2005/0038574 | A1 | 2/2005 | Gila et al. | |
| 2008/0258886 | A1 | 10/2008 | Summerlin | |
| 2009/0048778 | A1* | 2/2009 | Borkowicz et al. | 701/213 |
| 2009/0082963 | A1* | 3/2009 | Motoyama | 701/213 |
| 2011/0133987 | A1* | 6/2011 | Bernsten et al. | 342/417 |
| 2012/0218128 | A1* | 8/2012 | Tieman et al. | 340/989 |

FOREIGN PATENT DOCUMENTS

| DE | 44 09 167 | 6/1995 |
|---|---|---|
| DE | 198 26 904 C2 | 12/1999 |
| DE | 696 10 626 T2 | 5/2001 |
| DE | 199 57 536 A1 | 6/2001 |
| DE | 100 08 989 A1 | 9/2001 |
| DE | 100 46 571 A1 | 5/2002 |
| DE | 100 63 971 A1 | 7/2002 |

(Continued)

Primary Examiner — John A Tweel, Jr.
(74) Attorney, Agent, or Firm — RatnerPrestia

(57) ABSTRACT

A vehicle key for radio communication with a vehicle. The vehicle key has a radio transmitter for transmitting radio signals to the vehicle. The vehicle key has a radio receiver and/or audio receiver to be able to locate the vehicle within close range. A bidirectional communication with a transceiver of the vehicle is set up by the radio receiver and/or the audio receiver and the radio transmitter. Furthermore, a corresponding method for locating the vehicle by using the vehicle key is described.

16 Claims, 1 Drawing Sheet

(56) References Cited

FOREIGN PATENT DOCUMENTS

| DE | 101 11 552 A1 | 9/2002 |
|---|---|---|
| DE | 102 12 648 B4 | 10/2003 |
| DE | 103 06 568 A1 | 8/2004 |
| DE | 103 17 658 A1 | 11/2004 |
| DE | 10 2004 003 701 A | 8/2005 |
| DE | 10 2005 003 452 A1 | 7/2006 |
| DE | 10 2005 035 242 A1 | 2/2007 |

* cited by examiner

VEHICLE KEY

CROSS REFERENCE TO RELATED APPLICATIONS

This application is the U.S. national phase application of PCT International Phase Application No. PCT/EP2009/051065, filed Jan. 30, 2009, which claims priority to German Patent Application No. 10 2008 007 141.2, filed Jan. 31, 2008, and German Patent Application No. 10 2009 006 975.5, filed Jan. 30, 2009, the contents of such applications being incorporated by reference herein.

FIELD OF THE INVENTION

The present invention relates to a vehicle key for radio communication with a vehicle, the vehicle key having a radio transmitter for transmitting radio signals to the vehicle, and to a method for locating a motor vehicle within close range of the vehicle by using the vehicle key.

BACKGROUND OF THE INVENTION

The present invention corresponds to the generally known prior art that radio vehicle keys which transmit a radio signal to a vehicle and cause the central locking system, provided in the vehicle, to lock or to unlock the vehicle doors and the trunk are used for opening and closing vehicles. In this context, it is provided in a typical manner that the opening and closing of the motor vehicle is indicated by a visual or audible acknowledgement signal. Frequently, the flashing indicators of the vehicle are activated once or twice. In some cases, a quiet sound signal is also generated which is perceived in the immediate vicinity of the vehicle and signals to the driver that the closing process has been carried out successfully. Under certain circumstances, these signals also assist in finding the motor vehicle in large car parks. However, neither the flashing indicator signals nor the audible signals can be perceived so well that they reliably facilitate the finding of the vehicle.

It is also known to trigger by means of the vehicle key a radio signal which does not initiate a closing process but activates the horn of the vehicle. As a rule, the horn signal is so loud that it can be easily perceived and the vehicle can thus be found in a simple manner. However, the horn signal may disturb other road users considerably. In closed spaces (such as multistory car parks) or in inner cities, horn-blowing is frequently not permitted at all for this reason.

DE 10 2005 035 242 A1, which is incorporated by reference, describes a system for multi-purpose traffic surveillance by using a multiplicity of sensors, by means of which a vehicle is monitored in individual or staggered route sections in order to detect, to document and to punish violations of the road traffic regulations. Using these systems, it may also be possible to find a parked vehicle. However, this would require almost area-wide coverage with these surveillance systems which is neither desirable nor feasible.

From DE 696 10 626 T2, which is incorporated by reference, a method and a module for communicating with an object and/or for observing and especially locating a vehicle are known which are used for finding a motor vehicle again both in the close vicinity and, for example, after a theft, in a simple manner and by means of known technical systems. For this purpose, it is proposed to use three systems simultaneously for locating: a large-area paging network (paging services), a cellular mobile radio network and a local area network with band-spreading transmission method (code division multiple access network) which are coupled in a system provided in the vehicle. The large-area paging network is used for the major part of the communication and thus preserves the capacity of the mobile radio network. The cellular mobile radio network is used for bidirectional communication with the vehicle. The third network comprises a receiver which can reliably receive data e.g. from a receiving beacon and send back data to a local receiver. This third network is used, in the case of a theft, for sending data to the moving vehicle which then attracts attention, for example by audible and/or visual signals, or deactivates vehicle functions. However, such a system is not suitable for facilitating, for example, the finding of the vehicle in a large car park since the accuracy is not sufficient and the technical means are too complex.

In some cases, it is also known to integrate suitable locating functions in other mobile devices such as mobile telephones or PDAs. However, this requires that the driver of the vehicle always carries this additional device. In addition, separate technical setting-up of the additional device is necessary which is frequently found to be complex and susceptible to faults especially in modern mobile devices.

SUMMARY OF THE INVENTION

An object of at least one aspect of the invention, therefore, is to propose a system which enables the vehicle to be found within close range by simple means and without additional devices.

In a vehicle key of the type initially mentioned, it is provided for this purpose that the vehicle key has a radio receiver and/or an audio receiver, a bidirectional communication with a transceiver of the vehicle being set up by the radio receiver and/or the audio receiver and the radio transmitter. As a result, it is possible that the vehicle key exhibits not only radio signals for opening or closing the vehicle and activating other vehicle functions but can also receive, process and evaluate information from the vehicle itself.

The bidirectional communication can be implemented by radio communication in any transmitting direction. This is possible because the radio transmitter and the radio receiver can then be constructed in a simple manner as a transceiver. This is more advantageous than providing transmitter and receiver in the form of separate components and requires less installation space. The latter is of advantage especially for the radio key. According to an alternative embodiment, the bidirectional communication, according to aspects of the invention, can also be implemented by different types of communication. Thus it is possible to use for the communication from the radio key to the vehicle the radio communication also used for the closing function. According to aspects of the invention, other forms of communication which have high information content with respect to the desired close-range locating function can also be used for the return communication of the vehicle to the radio key. A sound or ultrasound communication is suitable for this purpose which can be received with a suitable microphone as audio receiver on the part of the radio key.

The information received may include information about the location of the motor vehicle which can be indicated subsequently by means of suitable display means on the key in order to enable the vehicle to be located within close range on the basis of the key. By this means, locating is achieved without separate technical additional devices only with the vehicle key and the vehicle itself in which all functions necessary for the locating are implemented.

The radio communication suitable for this bidirectional close-range communication according to aspects of the invention provides that the radio transmitter and the radio receiver are set up for communication in the UHF to SHF frequency band. The UHF (ultra high frequency) frequency typically covers a wavelength range from 0.3 to 3 GHz. The range from about 3 to 30 GHz adjoining this frequency range is the SHF (super high frequency) frequency band. Thus, the ISM (industrial, scientific and medical) frequency bands, which are available as freely usable frequency bands, for example 434 MHz, 868 MHz, 2.4 GHz or even higher frequencies, at about 60 GHz, may be considered. These frequency bands proposed according to aspects of the invention guarantee an adequate radio range within the close range, also within buildings such as multistory car parks, and enable radio direction finding links to be set up between vehicle and vehicle key in order to locate the motor vehicle.

According to one embodiment of the present invention, the positioning device is arranged for setting up a radio direction finding link between the vehicle and the vehicle key, the vehicle being the direction finder and the vehicle key being the object, or vice versa. In this context, it is advantageous if the vehicle itself handles the direction finding function and the key is the sought-after object since in this case the size of the direction finding antenna can be implemented in a simple manner in the desired size in the motor vehicle. After the direction finding information is available, it is then transmitted to the receiver in the vehicle key and indicated, for example, in the form of a compass point or by means of an electronic compass implemented in the vehicle key. If, in contrast, the vehicle key handles the direction finding function and the vehicle is the sought-after object, the metallic key of the vehicle key can be used as direction finding antenna. If necessary, the person holding the key can also act as direction finding antenna via a key-hand-coupling. As a rule, however, these direction finding antennas are not sufficiently directional so that great uncertainties in the direction finding are caused. Under certain circumstances, a direction finding antenna which can be electrically coupled to the key and which has a better directional effect can be provided, at least for the case of direction finding not being possible. In this variant, it is advantageous, however, that the direction finding information subsequently no longer needs to be transmitted from the vehicle to the vehicle key since said information is available directly in the vehicle key and is already related to the coordinate system of interest of the bearer of the key.

Furthermore, according to another embodiment of the invention, sound or ultrasound signals can be sent out by the vehicle for the purpose of locating and can be received by an audio receiver, such as a microphone, in the vehicle key. For the purpose of locating, i.e. for measuring direction and/or distance, the propagation time of the sound signal or its loudness can be evaluated. The latter corresponds to the evaluation of the received field strength in the case of radio direction finding.

A further possibility for locating the vehicle by means of the vehicle key lies in that the positioning device of the vehicle key has a receiver of a global positioning system (GPS, Galileo or the like), the positioning device being arranged for calibrating the position of the vehicle key with the position of the parked vehicle. By this means, the determination of the relative position of key and vehicle is possible in a simple manner via absolute coordinates of a fixed coordinate system of the global positioning system.

According to a variant of this embodiment, it can be provided that the position of the motor vehicle is transmitted to the key by a positioning device of the motor vehicle which is provided as part of a navigation system, when the vehicle is locked. When the driver of the motor vehicle then looks for his vehicle, he activates the search function of the vehicle key which thereupon determines his own position in the coordinate system of the global positioning system and points the way to the vehicle, for example by means of a visual display, via a relative comparison of the various position values. This method is thus based on evaluating the difference between two position marks both of the vehicle key and of the vehicle, both the vehicle key and the motor vehicle having a receiver of a global positioning system. From the difference of the positions determined by the key and of the position reported by the vehicle, the distance and direction of the vehicle can be determined. An indication could thus be, for example, "600 m direction NW". Extended by an electronic compass in the visual display of the key, an arrow can also be indicated directly, bearing the information "600 m in direction of arrow".

According to an alternative embodiment, it is also possible that the receiver of the global positioning system in the vehicle key, when locking the vehicle, stores this position and uses it later when a vehicle driver wishes to locate the vehicle with the aid of his vehicle key. To calculate the position of the vehicle in such a case, it is sufficient, according to aspects of the invention, to calculate the time difference of the coordinates of the vehicle key relative to the stored coordinates of the vehicle. In this case, an indication of the following type is conceivable: "600 m direction NW" and "20 m=8 storys above". In the variant of the invention mentioned last, the vehicle key does not mandatorily have to have bidirectional communication since it is sufficient in this case to provide a vehicle key with a positioning device which has a receiver of a global positioning system and is arranged for calibrating the position of the vehicle key with the position of the parked vehicle. According to aspects of the invention, this variant can also be used, in addition to the aforementioned locating options based on bidirectional communication, in order to increase the accuracy and reliability of the system.

According to another embodiment, it is provided, therefore, that the vehicle key has both the positioning device for setting up a radio direction finding link and the positioning device with a receiver of a global positioning system since in this case the various position information items can be combined with one another. Thus it is possible, for example, that the vehicle key, when a locating function is requested, sends a radio message to the vehicle and requests it to send back its position to the key in the coordinates of the global positioning system. This transmitting process can be used as radio direction finding link at the same time so that two separate evaluation methods for locating the vehicle are available in the key and reliable and accurate locating is possible.

To be able to indicate the position of the motor vehicle relative to the vehicle key after completed locating, the vehicle key, according to an embodiment of the invention, can have a visual display for indicating the relative position of the vehicle to the vehicle key. For this purpose, the display can be constructed in the form of a display for representing a visual compass which points in the direction of the motor vehicle in the form of a simple arrow representation. As an alternative, an actual compass could also be shown which in each case indicates the North direction, connected with the information of the direction in which the vehicle can be found (for example direction South-East (SE)). If necessary, a text display for indicating locating information can also be provided.

In an alternative or supplementary embodiment, the vehicle key can also have an audible display for indicating the relative position of the vehicle to the vehicle key. In this case, the direction can be indicated, for example, by a beeping tone, pitch and rate of repetition for direction and distance from the motor vehicle, especially if the position of the vehicle key changes relative to the vehicle. The vehicle driver looking for his vehicle would thus activate the locating function of his key in this case and change his location. The audible display changing during this process provides him with information relating to the location of his vehicle.

If necessary, a route finder can even be integrated in the visual display if sufficient storage capacity for storing a navigation system exists in the key. If necessary, this could then also be used for finding certain targets independently of the locating of the motor vehicle.

Since the power consumption for the locating methods proposed is comparatively high and the battery would have to be changed frequently for this reason in vehicle keys equipped in this manner, it is proposed, according to an embodiment of the present invention, that the vehicle key has an accumulator as power supply. This can be configured in such a manner that it is inductively charged when the vehicle is moving. To avoid that the locking function of the key no longer operates reliably with a discharged accumulator, it can also be provided, according to aspects of the invention, that the accumulator is only provided for the locating function. The locking function of the key can be effected in a conventional manner via a battery which, as a rule, supplies sufficient power for several years.

In view of the aforementioned functionalities, the radio key proposed according to aspects of the invention can also be integrated as a software solution in another electronic device which has an adequate power supply and visual and audible display means, in any case. Mobile telephones, PDAs, smartphones or similar electronic devices which in most cases users are continuously carrying today are suitable for this purpose. This variant of the invention has the advantage that no further additional vehicle key is needed in which additional electronic components must be integrated. According to aspects of the invention, the radio key claimed is also understood to be such a solution.

The invention also relates to a method for locating a motor vehicle within close range by using the aforementioned vehicle key. In this context, it is provided that the vehicle key determines the position of the vehicle and the position of the vehicle key or the relative distance between the vehicle key and the vehicle and indicates the relative direction between vehicle key and vehicle.

According to aspects of the invention, the positions of vehicle and vehicle key can be determined by radio direction finding between vehicle key and vehicle, for which purpose a bidirectional radio communication is set up between the vehicle key and the vehicle.

According to another embodiment of the method, the distance between the vehicle and the vehicle key can be determined from the field strength of the radio signal received and used as direction finding signal.

According to a variant of the proposed method, the vehicle key can send a position enquiry to the vehicle, for example by means of a radio signal. The vehicle thereupon emits a short sound or ultrasound pulse (ultrasound burst) which is received in the vehicle key and evaluated for locating the vehicle.

For this purpose, it can be provided that the vehicle key determines the propagation time of the sound or ultrasound pulse. The vehicle key knows the time of emission of the sound or ultrasound signal in its own time system, for example due to the emission of the position request effected as part of the bidirectional communication or due to a radio return message. The time of reception can be determined by the key in a simple manner when the signal is detected by the audio receiver, such as a microphone.

To indicate to the user whether he is moving away from the vehicle or going towards the vehicle, it can also be provided, according to aspects of the invention, that the vehicle key emits position requests to the vehicle in a time sequence and in each case indicates at the vehicle the received loudness of the sound pulse or ultrasound pulse or, respectively, the received field strength of the received radio (direction finding) signal.

As an alternative or in addition, the vehicle key can also determine its current position by means of locating in a global positioning system, for example GPS, Galileo or the like, and compare it with the position of the vehicle.

In one exemplary embodiment of this method, the vehicle key can store the position of the vehicle in a local memory when the vehicle is being locked. For this purpose, the position of the vehicle can be transmitted to the vehicle key by the vehicle on request in a bidirectional radio communication. As an alternative, it is possible that a vehicle key equipped with a receiver of a global positioning system determines and stores its own position when the vehicle is being locked. In this case, the vehicle key does not necessarily need to be equipped with a bidirectional radio communication. However, the option of bidirectional radio communication is appropriate in the case where a number of users having different vehicle keys share one vehicle. If the vehicle, after having been parked by a user, has been moved by a second user having another key, the information about the current position of the vehicle must really be transmitted by means of bidirectional communication on request by the vehicle key.

If a display of the vehicle key has an electronic compass, a directional indication with specification of the distance for finding the vehicle relative to the vehicle key can take place independently of the alignment of the key. As an alternative, a direction of the key, for example by the metallic locking part of the key, can be used for indicating the relative direction, relative to which the direction of the sought-after and located vehicle is indicated.

The driver of a vehicle can thus easily find his vehicle even in the case where he has not parked it himself. This is a typical problem of car hiring firms at large hiring locations such as, for example, at airports or families living in cities who share a car without a fixed parking space.

Further advantages, features and possible applications of the invention are also obtained from the subsequent description of an exemplary embodiment and the drawing. In this context, all features described and/or represented pictorially by themselves or in arbitrary combination form the subject matter of the present invention, also independently of their combination in the claims or their references.

BRIEF DESCRIPTION OF THE DRAWINGS

The invention is best understood from the following detailed description when read in connection with the accompanying drawings. Included in the drawings is the following FIGURE.

DETAILED DESCRIPTION OF THE INVENTION

Figure 1:
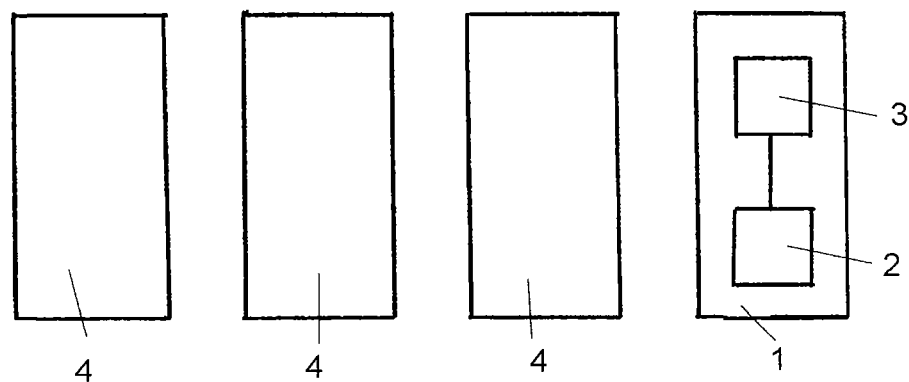
FIG. 1 shows a diagram of a vehicle key equipped with the locating function according to aspects of the invention, with the associated vehicle.
Figure 1:
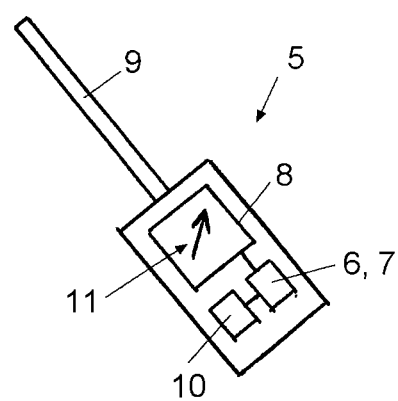

FIG. 1 shows a vehicle 1 which has a transceiver 2 as positioning device which is equipped with a receiver 3 of a global positioning system, such as a GPS or Galileo receiver.

With losses in the spatial resolution, direction finding in the cellular system of the GSM and UMTS mobile radio network is also conceivable. The receiver 3 of the global positioning system is thus connected to the transceiver 2 for radio communication so that the positions of the vehicle 1, determined by the global positioning system, can be forwarded to the transceiver 2 and emitted by the latter.

The vehicle 1 is parked in a parking space next to other vehicles 4 which are not equipped with this locating function or the locating function of which is not addressed by the vehicle key 5 shown, for example because they transmit with another frequency or with another code.

The vehicle key 5 shown as a diagram has a device, shown as one unit, for a radio receiver 6 and a radio transmitter 7 which are arranged for setting up a bidirectional radio communication with the transceiver 2 of the vehicle 1.

Due to the bidirectional radio communication, especially in the UHF or SHF frequency band, it is possible that a radio direction finding link between the vehicle key 5 and the vehicle 1 is set up which enables the relative distance and direction between vehicle key and vehicle to be determined.

For this purpose, the vehicle 1 can serve as direction finder and the vehicle key 5 as object. This has the advantage that a sufficiently large and accurate direction finding antenna can be installed in the vehicle. The relative position information items obtained are then transmitted by means of the bidirectional radio communication to the vehicle key 5 and displayed there in a display 8.

As an alternative, the vehicle key 5 can also be constructed, in some exemplary embodiments, with the metallic locking part 9 as direction finding antenna as direction finder and the vehicle 1 as object. If necessary, the direction finding antenna is enlarged or reinforced by a connection of the metallic locking part with the driver holding the vehicle key. Furthermore, direction finding antennas integrated separately into the key or electrically connectable to the latter can be used. For example, a ferrite rod antenna can be used as direction finding antenna in the low-frequency range. In the high-frequency range, a Yagi, parabolic, multi-patch or similar antenna with high directivity is possible.

It is also possible to determine the distance via the propagation time of an acoustically transmitted signal by means of a propagation time measurement which is triggered, for example, by radio. For this purpose, the vehicle key sends a position request by radio to the vehicle and the vehicle responds with the emission of an ultrasound signal which propagates at the speed of sound. The position request thus triggers the emission of the ultrasound signal. The vehicle key therefore knows in its own time base the time of emission of the ultrasound signal which, due to the high speed of propagation, coincides with the emission of the ultrasound signal within the range of measuring accuracy, wherein typical signal propagation and/or signal processing times can be considered additionally.

By means of a microphone in the vehicle key, the distance can thus be determined by means of a propagation time measurement and also the direction from the vehicle key to the vehicle can be determined by determining the signal peak over the direction.

This type of evaluation can deliver very good results over short distances up to about 200 meters if the echo leading to a signal corruption is not predominant. According to aspects of the invention, therefore, short signal pulses are used. By this means, a greatly space-saving, cost-effective and quiet locating of the vehicle within a close range is achieved also by means of audio methods, wherein the vehicle can continuously emit these ultrasound signals since there is sufficient power available. This increases the chances of reliable locating of the vehicle.

Apart from the setting-up of the radio direction finding links, the key 5 also contains a receiver 10 of a global positioning system which locates the key in the coordinates of this positioning system and determines the key position. This receiver 10 of the global positioning system acts simultaneously as positioning device which compares the position of the vehicle 1 and of the vehicle key 5 with one another in order to represent the direction of the vehicle 1 relative to the vehicle key 5.

For this purpose, the display 8 of the key 5 is equipped with an electronic compass 11 which, for example, indicates the direction to the vehicle 1 by means of an arrow relative to the metallic locking part 9 of the vehicle key 5. As an alternative, the electronic compass 11 can also indicate the North direction as usual and in the display 5 a text indication about the direction and distance in which the vehicle 1 is located relative to the vehicle key 5 can be provided.

The position of the vehicle 1 in the coordinates of the global positioning system is obtained by the key either on request by means of radio communication from the receiver 3 of the vehicle 1. As an alternative, it is also possible that, when the vehicle 1 is locked, the receiver 10 of the global positioning system in the vehicle key determines the position of the vehicle key 5 and stores it as position of the vehicle 1 which is then used later for comparison with the current key position during the locating.

As a result, it is possible by means of simple technical means to locate the vehicle 1 without having to provide additional electronic devices.

The invention claimed is:

1. A vehicle key for radio communication with a vehicle, the vehicle key comprises:
    a radio transmitter for transmitting radio signals to the vehicle;
    at least one of a radio receiver and an audio receiver; and
    a display for displaying information to a user of the vehicle key;
    wherein the vehicle key:
    1) automatically determines and stores a position of the vehicle key when the vehicle is being locked,
    2) determines a current position of the vehicle key, and
    3) indicates, by the display, a relative direction between the vehicle key and the vehicle based on the current position of the vehicle key, and the position of the vehicle key determined when the vehicle was being locked.

2. The vehicle key as claimed in claim 1, wherein the radio transmitter and the radio receiver are set up for communication at a UHF frequency or an SHF frequency.

3. The vehicle key as claimed in claim 1, wherein the vehicle key has a positioning device capable of determining the relative direction and/or distance between the vehicle key and the vehicle by means of bidirectional radio communication.

4. The vehicle key as claimed in claim 3, wherein the positioning device is also capable of setting up a radio direction finding link between the vehicle and the vehicle key.

5. The vehicle key as claimed in claim 3, wherein the positioning device further comprises a receiver of a global positioning system, the positioning device being arranged for calibrating the position of the vehicle key with the position of the parked vehicle.

6. The vehicle key as claimed in claim 1 further comprising a visual display for indicating the relative position of the vehicle to the vehicle key.

7. The vehicle key as claimed in claim 1 further comprising an audible display for indicating the relative position of the vehicle to the vehicle key.

8. The vehicle key as claimed in claim 1 further comprising an accumulator and/or a battery as power supply.

9. A method for locating a motor vehicle within close range by using a vehicle key, comprising the steps of:
   automatically determining and storing, by the vehicle key, a position of the vehicle key when the vehicle is being locked;
   determining a current position of the vehicle key; and
   indicating a relative direction between the vehicle key and the vehicle based on the current position of the vehicle key, and the position of the vehicle key determined when the vehicle was being locked.

10. The method as claimed in claim 9 further comprising effectuating a radio direction finding signal between the vehicle key and the vehicle.

11. The method as claimed in claim 10, wherein a distance between the vehicle and the vehicle key is determined from the field strength of the received radio direction finding signal.

12. The method as claimed in claim 9 further comprising sending a position request to the vehicle with the vehicle key and emitting a short sound pulse or ultrasound pulse from the vehicle.

13. The method as claimed in claim 12 further comprising determining the propagation time of the sound or ultrasound pulse with the vehicle key.

14. The method as claimed in claim 13 further comprising averaging over a number of sound or ultrasound pulses is effected during the determination of the propagation time.

15. The method as claimed in claim 12 further comprising:
   emitting a number of position requests to the vehicle with the vehicle key in a time sequence; and
   indicating, on the vehicle key, the received field strength of the radio signal or the received loudness of the sound pulse or ultrasound pulse.

16. The method as claimed in claim 9, wherein the vehicle key determines its current position by means of locating in a global positioning system and compares it with the position of the vehicle.

\* \* \* \* \*

UNITED STATES PATENT AND TRADEMARK OFFICE
CERTIFICATE OF CORRECTION

PATENT NO.       : 8,643,510 B2                                          Page 1 of 1
APPLICATION NO. : 12/865002
DATED            : February 4, 2014
INVENTOR(S)      : Schräbler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Twenty-ninth Day of September, 2015

Michelle K. Lee
*Director of the United States Patent and Trademark Office*